United States Patent Office 3,192,104
Patented June 29, 1965

3,192,104
FUNGICIDAL COMPOSITIONS COMPRISING CHLOROPHENOL MERCURY COMPOUNDS AND TETRAALKYLTHIURAM SULFIDE COMPOUNDS STABILIZED WITH AMINES
Harris M. Baker, Glen Farms, Md., assignor to E. I. du Pont de Nemours and Company, Wilmington, Del., a corporation of Delaware
No Drawing. Filed June 1, 1960, Ser. No. 33,081
3 Claims. (Cl. 167—42)

This invention relates to a method of stabilizing a fungicidal composition containing tetraalkylthiuram sulfides and phenol mercury compounds using certain selected amines, and to the resulting stabilized compositions.

A wide variety of tetraalkylthiuram sulfide compounds and organic mercury compounds are known to possess fungicidal activity. It has furthermore been known to apply a combination of these fungicidally active compounds simultaneously in the control of fungus diseases. However, in the prior art, this simultaneous treatment has usually been done by admixing the two materials in an aqueous system immediately prior to application to the area to be treated. This has required separate packaging, separate mixing, loss of time, additional handling of toxicants, etc., in the preparation of the spraying solution.

The reason why fungicidal tetraalkylthiuram sulfide compounds and organic mercury compounds have not been combined together in a dry composition is their instability when together. The active compounds interact to produce decomposition products which have decreased solubility in water and are significantly less fungicidally active.

According to the present invention, it has now been found that one or more of a narrow class of tetra-alkylthiuram sulfides from the group consisting of tetramethylthiuram monosulfide, tetramethylthiuram disulfide, tetraethylthiuram monosulfide and tetraethylthiuram disulfide, can be admixed in a substantially anhydrous and unexpectedly stable composition with one or more of a narrow group of stabilizers and one or more of a narrow class of fungicidally active organic mercury compounds, namely phenol mercury compounds selected from the group of compounds having the formula:

(1)
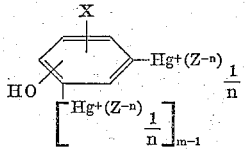

wherein X is selected from the group consisting of hydrogen, chlorine, bromine, hydroxyl, and lower alkyl of less than four carbon atoms; $m$ is a whole number of less than 3, namely 1 or 2; $n$ is a whole number of less than 4; and Z is a negative radical selected from the group consisting of halide, acetate, propionate, lactate, carbonate, hydroxyl, sulfate and phosphate.

The essential stabilizer ingredient discovered to be uniquely successful in the practice of the present invention is selected from the following group:

hexamethylenetetramine
cyanamide
tri-lower alkanolamines

By lower alkanol is meant alkanols having two through eight carbon atoms per alkyl group. It is preferred that the hydroxyl group be located beta to the amino group, the most preferred amines being triisopropanolamine and triethanolamine.

If one of the above stabilizers is included in the compositions of this invention, the rate of interaction of the two fungicidally active compounds is greatly reduced and the compositions unexpectedly can be stored for extended periods of time.

Illustrative of the phenol mercury compounds within the scope of this invention can be listed the following:

catechol mercury lactate
resorcinol mercury propionate
hydroquinone mercury phosphate
methylphenol mercury carbonate
chlorophenol mercury hydroxide
chloro mercury phenol (phenol mercury chloride)
4-mercury chlorophenol sulfate (chlorophenol mercury sulfate)
2,4-dimercury chlorophenol sulfate
2,4-dimercury chmlorophenol chloride
2,4-dimercury chlorophenol acetate
4-mercury chlorophenol acetate (chlorophenol mercury acetate)
4-mercury-bromophenol sulfate These mercury compounds can be prepared, for example, in accordance with the teachings of U.S. Patent No. 1,618,370. These mercury derivatives have small water solubilities, ranging up to about 4.0% at 20° C.

If the solubility of the phenol mercury compound is very low, for example, if less than about 0.1 gram dissolves in 100 grams of water at 20° C., it is preferred to add to the substantially anhydrous fungicidal compositions of this invention, as an additional ingredient, a solid water-soluble inorganic base selected from the group consisting of sodium hydroxide, calcium hydroxide, calcium oxide, potassium hydroxide, sodium carbonate, and potassium carbonate. By water-soluble is meant a solubility in water of at least 0.1% at 20° C. It will be noted that the effect of the inorganic base will be to neutralize the phenol mercury compound and thus render it more soluble in water. The base should be of a solubility greater than the phenol mercury compound.

Compositions of this invention containing the two fungicidal active types of compounds in combination with the stabilizer essential to the present invention are characterized by synergistic fungicidal activity when compared with compositions containing only one of the fungicidally active compounds. The compositions are especially useful for the treatment of turf and of certain fruit trees.

The compositions of this invention can also contain, in addition to the three essential components referred to above and the one optional component just mentioned, solid adjuvants, such as diluents, anti-foaming agents, anti-dusting agents, desiccants, dyes, wetting and dispersing agents, etc. Plant nutrients or fertilizers, such as urea, urea-formaldehyde polymers, soluble iron, and the trace elements manganese, zinc, copper, boron, and molybdenum in the oxide form can also be included.

One of the stabilizers utilized in the practice of the present invention and contained in the compositions of the present invention should be present in such compositions, on a weight equivalent basis, of at least 5% with respect to the mercury present. The upper limit of the weight ratio of stabilizer to the organo mercurial, expressed as metallic mercury, is not critical and in general satisfactory stabilization of the compositions is provided when the stabilizer to mercury weight ratio is in the range from 0.05:1 to 10:1. Particularly stable compositions are obtained within the range from 0.4:1 to 3.2:1 and especially from 0.8:1 to 2.4:1.

When the optional inorganic base is included, it should preferably be present in at least a molar equivalent amount with respect to the phenol mercury compound. The upper limit of the molar equivalent ratio is not considered to be particularly critical, and in general satisfactory compositions are obtained when the phenol mercury compound to inorganic base molar equivalent ratio is within the range from 1:1 to 1:40. Particularly advantageous compositions are obtained within the range from 1:10 to 1:30 and especially from 1:15 to 1:20.

In the compositions of this invention, the tetraalkylthiuram sulfide compound should be present in an amount by weight at least equal to the phenol mercury compound. The compositions can contain as much as 10 parts by weight of the tetraalkylthiuram sulfide for each one part by weight of the phenol mercury compound, and for some uses, as in fruit-tree sprays, can contain 30 times as much of the tetraalkylthiuram sulfides by weight as the aryl mercury compounds.

The compositions of this invention, comprising one or more of the phenol mercury derivatives in admixture with one or more of the bis-alkylthiuram sulfides, should be substantially anhydrous. By "substantially anhydrous" it is meant that the water content should not exceed 5.0%, by weight, of the total. Compositions having less than 2.0%, by weight, of water are preferred. It may be advantageous to maintain the compositions in an anhydrous state by including a desiccant such as calcium oxide, silica gel, or anhydrous sodium sulfate in the formulation. The low water content avoids problems of caking and loss of flowability ("setting up," hardening).

In practicing the fungicidal methods of this invention, the novel compositions containing the essential ingredients are applied to the organic material to be treated for the control of fungi at a dosage sufficient to exert fungicidal action. They are particularly suitable for the treating of plants such as seeds, vegetables, ornamental plants and fruit-bearing trees such as apple and pear. Some of these compositions are also effective when applied directly to the soil for controlling plant fungi. Also they can be used to treat organic fibers and fabrics and various cellulosic materials such as leather and wood. Likewise they can be used to treat paints and lubricating oils.

In a particular preferred use, the compositions of this invention are applied as a turf fungicide to lawn type grasses for the control of such fungus diseases as dollar spot (*Sclerotinia homococarpa*), brown patch (*Pelliculiaria filamentosa*), snow mold (*Fusarium nivali*), copper spot (*Gleocercospora sorghi*), and blight caused by Helminthosporium spp. Such treatment is particularly advantageous for fungus control of golf course turf.

In application, fungicidal control is obtained in most instances by applying the compositions of this invention at a dosage or rate from about 1 to 100 pounds of combined active ingredients per acre, the optimum amount within this range being largely dependent upon the variables mentioned heretofore. In application directly to lawn grasses as a turf fungicide in most instances the dosage or rate is from about 3 to 40 pounds per acre. The optimum dosage can be determined in each instance by one of the means conventional in the art. It is, of course, dependent upon the particular fungicidal formula selected, the method of application, the climatic conditions, and, in the case of application to vegetation, the state and condition of growth of the vegetation to be treated.

The combination of phenol mercury derivatives with tetraalkylthiuram sulfide derivatives in one single turf fungicide composition is especially attractive to a homeowner because of its ease of application.

The fungicidal compositions of this invention contain, in sufficient amount together to exert fungicidal action, one or more of the above-named tetraalkylthiuram sulfide compounds in admixture with one or more of the above-described phenol mercury compounds of the Formula 1, and a stabilizer of the above-named group of amines. Preferred compositions also contain a water-soluble solid inorganic base compound, as described above, as a fourth component. These ingredients can be combined in admixture with a solid carrier material or conditioning agent of the kind used and commonly referred to in the art as a fungicide adjuvant or modifier. The conventional fungicide adjuvants useful in this invention are, as stated above, inert solids, wetting and dispersing agents, protective colloids, anti-foaming agents, anti-dusting agents, and coloring agents. They provide suitable solid dry formulations adapted for ready and efficient application using conventional applicator equipment. Usually from about 1% to about 95% by weight of the total fungicidal composition will be composed of the essential fungicidal ingredients.

The solid compositions of this invention are preferably in the form of substantially anhydrous wettable powders. They are compounded as homogeneous powders that can either be used as such, diluted with inert solids to form dusts, or granules, or subsequently suspended in a suitable liquid medium for spray application. The phenol mercury compound and the amine stabilizer can be pre-blended before the other components of the composition are added. The powder is usually comprised of the essential ingredients referred to above admixed with minor amounts of conditioning agents or diluents. Natural absorptive clays such as attapulgite, relatively nonabsorptice clays such as kaolin, or materials such as diatomaceous earth, walnut shell flour, tobacco dust, redwood flour, synthetic fine silica, calcium silicate, and other inert solid carriers of the kind conventionally employed in powder fungicidal compositions, can be used as diluents. The fungicidal ingredients and stabilizer, together with the inorganic base, if the latter is to be used, usually make up from about 5% to about 90% of these powdered compositions.

When the substantially anhydrous compositions are to be used in the form of wettable powders, they can also include one or more surface-active agents such as wetting, dispersing, or emulsifying agents. These materials cause the compositions to wet and disperse easily in water to give aqueous sprays. The wettable powders can be conveniently diluted with water at a rate of 1 to 20, and preferably 2 to 10, pounds of powder per 100 gallons of water.

The surface-active agents employed can be of the anionic, cationic, or nonionic type. They include, for example, sodium oleate, sulfonated petroleum oils, alkyl aryl sulfonates, sodium lauryl sulfate, polyethylene oxide derivatives, lignin sulfonates, and other surface-active agents. A detailed list of such agents is set forth in an article by McCutcheon in "Soap and Chemical Specialties," December 1957; January, February, March, April, 1958. Care must be taken, however, that the surfactants are compatible with the fungicidal ingredients.

Other conditioning agents that can be used with these compositions include protective colloids (or gums) such as casein, Methocel, and hydroxyethylcellulose. Where powders are to be relatively nondusty and yet rapidly wettable and dispersible in water, glycols or paraffinic oils can be used in the compositions. Dyes or antifoam agents can also be added.

Where it is desired to incorporate nutrients, fertilizers, trace elements, and the like, into the fungicidal compositions, such materials can serve in part as the carrier. For example, the fungicidal ingredients can be mixed with such fertilizers as urea, finely-divided bone meal, and urea-formaldehyde polymers such as those disclosed in U.S. Patents Nos. 2,415,705 and 2,592,809. Fertilizers containing mixtures of nitrogen compounds, phosphorous compounds, and potassium compounds may also be used. Various mineral trace elements such as calcium, sulfur, magnesium, copper, manganese, iron, boron, zinc and molybdenum can also be incorporated into the fungicidal compositions of this invention. These incorporated elements will usually be in the form of chemical compounds such as their oxides, nitrates, sulfates and the like.

When a fertilizer, such as those described above, is used as a carrier, the compounded formulations can be dusts, wettable powders, or granules. In the case of granules, the phenol mercury-thiuram-hexamethylenetetramine mixture can be distributed throughout the granule or be fixed on its surface.

The weight ratio of fertilizer to the phenol mercury compound, expressed as mercury, can range from about 30,000:1 to about 0.1:1, and preferably from about 5,000:1 to about 1:1. It will be understood that the wide range of ratios shown here is based on the fact that fertilizer requirements will vary so widely with different conditions of soil, turf and climate. When trace elements are added, these will each normally constitute less than 5% by weight of the total composition and, more usually, each such element will constitute less than 0.5% by weight of the total composition. Greater amounts than 5% by weight of trace elements can be employed, however, when the compositions are to be applied to soils that are greatly deficient in this respect.

The tetraalkylthiuram sulfides can be prepared conveniently, for example, according to the processes disclosed in U.S. Patents Nos. 2,751,415, 2,751,416 and 2,777,878.

Use of the novel dry formulations of this invention contributes outstandingly to the ease of handling and efficiency of application of the fungicidal ingredients.

In order that the invention may be better understood, the following examples are given in addition to those already set forth above:

*Example 1*

| | Percent |
|---|---|
| Chlorophenol mercury sulfate | 11.4 |
| Tetramethylthiuram disulfide | 45.0 |
| Hydrated lime | 13.9 |
| Sodium carbonate | 13.2 |
| Kaolinite | 2.7 |
| Triisopropanol amine | 10.0 |
| Sodium lignin sulfonate | 1.2 |
| Sodium alkyl aryl sulfonate | 1.0 |
| Green Lake dye | 1.0 |
| Ethylene glycol | 0.6 |

The above ingredients are well blended and then ground in a hammer mill to a small particle size substantially less than 50 microns. The composition is mixed with water in a spray tank at 3 ounces of composition per 5 gallons of water.

When sprayed on turf at the rate of 5 gallons of slurry per 1,000 square feet of turf on a schedule of seven to ten days throughout the season, the composition is found to control the common turf diseases including brown patch (*Pellicularia filamentosa*), dollar spot (*Sclerotinia homeoscarpa*) and copper spot (*Gleocercospora sorghi*).

*Example 2*

| | Percent |
|---|---|
| Chlorophenol mercury sulfate | 11.6 |
| Tetramethylthiuram disulfide | 46.2 |
| Lime (CaO) | 7.6 |
| Sodium carbonate | 15.3 |
| Hexamethylenetetramine | 10.0 |
| Urea | 4.8 |
| Sodium lignin sulfonate | 1.2 |
| Sodium alkyl aryl sulfonate | 1.1 |
| Green Lake dye | 1.2 |
| Hodag HC 603 antifoam | 1.0 |

These above ingredients are well blended and then ground in a hammer mill to a small particle size, substantially less than 50 microns. The composition is mixed with water in a spray tank at 3 to 5 ounces of composition per 5 gallons of water. When sprayed on turf at the rate of 5 gallons of slurry per 1,000 square feet of turf on a schedule of seven to ten days throughout the season, the composition is found to give good control of blight caused by Helminthosporium spp. and good control of snow mold (*Fusarium nivali*).

*Example 3*

| | Percent |
|---|---|
| Chlorophenol mercury sulfate | 11.6 |
| Tetramethylthiuram disulfide | 46.2 |
| Hydrated lime | 10.0 |
| Soda ash | 15.3 |
| Sodium alkyl aryl sulfonate | 1.1 |
| Sodium lignin sulfonate | 1.2 |
| Green Lake dye | 1.2 |
| Kaolinite | 3.4 |
| Hexamethylenetetramine | 10.0 |

These ingredients are blended in a box shaker or in a ribbon blender and ground in a micropulverizer until the particle size is substantially less than 50 microns.

The above product is stored in a closed container at room temperature next to a similar formulation in which the hexamethylenetetramine is omitted and replaced by a like amount of kaolinite. After forty days of such storage, the soluble fraction of the mercury is extracted from both samples. The unstabilized product has lost a great deal of mercury solubilites, whereas the stabilized composition still retains the majority of the initially soluble mercury in water-soluble form.

*Example 4*

| | Percent |
|---|---|
| 2,4-dimercury chlorophenol acetate | 5 |
| Tetramethylthiuram monosulfide | 45 |
| Hydrated lime | 14 |
| Sodium carbonate | 14 |
| Cyanamide | 20 |
| Sodium lignin sulfonate | 1 |
| Sodium alkyl aryl sulfonate | 1 |

The above materials are well blended and ground in a ball mill until the particle size is substantially less than 50 microns.

The composition is mixed with water in a spray tank at 3 ounces of composition per 5 gallons of water. When sprayed on bent grass at the rate of 5 gallons of formulation per 1000 square feet of turf on a schedule of every 7 days throughout the season, the composition is found to control dollar spot (*Sclerotinia homeoscarpa*).

*Example 5*

| | Percent |
|---|---|
| Chlorophenol mercury acetate | 12 |
| Tetraethylthiuram disulfide | 12 |
| Sodium carbonate | 2 |
| Kaolinite | 67 |
| Sodium lignin sulfonate | 1 |
| Sodium alkyl aryl sulfonate | 1 |
| Triethanol amine | 5 |

The above materials are well blended and then ground in a hammer mill until the particle size is substantially below 50 microns.

The composition is mixed with water in a spray tank at 5 ounces of composition per 5 gallons of water. When sprayed on blue grass at the rate of 5 gallons of formulation per 1000 square feet of turf, the composition is found to control brown patch (*Pellicularia filamentosa*).

*Example 6*

| | Percent |
|---|---|
| 2,4-dimercury chlorophenol sulfate | 7 |
| Tetraethylthiuram monosulfide | 71 |
| Sodium carbonate | 7 |
| Hexamethylenetetramine | 14 |
| Sodium lignin sulfonate | 1 |

These materials are prepared into a fungicidal spray as described in Example 5. When applied to fescue grass at the rates and schedules described in Example 5, the composition is found to control blight caused by Helminthosporium spp.

Example 7

| | Percent |
|---|---|
| 4-mercury chlorophenol acetate (chlorophenol mercury acetate) | 10 |
| Tetramethylthiuram disulfide | 45 |
| Hydrated lime | 7 |
| Sodium carbonate | 7 |
| Hexamethylenetetramine | 10 |
| Kaolinite | 19 |
| Sodium lignin sulfonate | 1 |
| Sodium alkyl aryl sulfonate | 1 |

These materials are prepared into a fungicidal spray as described in Example 5. When applied to a mixture of blue, fescue and bent grasses at the rates described in Example 5, the composition is found to control snow mold (*Fusarium nivali*).

Example 8

| | Percent |
|---|---|
| Catechol mercury lactate | 10 |
| Tetramethylthiuram disulfide | 45 |
| Hydrated lime | 7 |
| Sodium carbonate | 7 |
| Hexamethylenetetramine | 1 |
| Kaolinite | 28 |
| Sodium lignin sulfonate | 1 |
| Sodium alkyl aryl sulfonate | 1 |

These ingredients are blended in a ball mill until thoroughly mixed and ground in a hammer mill until the particle size is substantially less than 50 microns. The mixture is an excellent turf fungicide and can be used in a manner similar to that described in Example 7. When prepared, formulated and applied to fescue grass as in Example 5, the composition is also found to control copper spot (*Gleocercospora sorghi*).

Example 9

| | Percent |
|---|---|
| Chloro mercury phenol (phenol mercury chloride) | 10.4 |
| Tetramethylthiuram disulfide | 46.2 |
| Lime (CaO) | 10.6 |
| Casein | 0.8 |
| Green Lake dye | 1.2 |
| Sodium carbonate | 15.5 |
| Hodag HC 303 antifoam | 1.2 |
| Triisopropanol amine | 11.2 |
| Partially desulfonated ligno sulfonate | 1.2 |
| Sodium alkyl aryl sulfonate | 1.1 |
| Ethylene glycol | 0.6 |

The above materials are well blended and ground in a ball mill (taking care to keep the material substantially anhydrous), until the particle size is substantially less than 50 microns.

The mixture is an excellent turf fungicide and can be used in a manner similar to the formulations of Examples 5 and 6.

Example 10

| | Percent |
|---|---|
| 4-mercury bromophenol sulfate | 2.2 |
| Tetramethylthiuram disulfide | 66.0 |
| Hydrated lime | 13.0 |
| Sodium carbonate | 12.0 |
| "Goulac" (partially desulfonated ligno sulfonate) | 2.0 |
| Sodium alkyl aryl sulfonate | .5 |
| Ethylene glycol | 1.0 |
| Triethanol amine | 3.3 |

These materials are well blended and then ground in a hammer mill until the particle size is substantially less than 50 microns.

The above composition is mixed with water at the rate of 1 pound per 100 gallons. Apple trees that have become infected with the apple scab fungus, *Venturia inaequalis*, during the previous 72 hours or less are sprayed with the resulting suspension. The incipient apple scab is killed out by the application. In addition, the trees are protected from further infection by this fungus for a period of 7–14 days without any injury to the trees. Spraying of phenyl mercury compounds alone at the same metallic mercury level as in the combination also eradicates the incipient disease, but causes many leaves on the trees to fall and, in addition, fails to provide protection from subsequent infection. Thiuram used alone will provide protection after application but does not eliminate incipient infection up to 72 hours old as does the composition of this example.

Example 11

| | Percent |
|---|---|
| 2,4-dimercury chlorophenol chloride | 5.8 |
| Tetramethylthiuram disulfide | 50.5 |
| Calcium oxide | 5.0 |
| Sodium carbonate | 16.0 |
| Kaolinite | 5.0 |
| Partially desulfonated ligno sulfonate | 2.0 |
| Sodium alkyl aryl sulfonate | 0.5 |
| Cyanamide | 15.2 |

The above materials are well blended and then ground in a hammer mill until the particle size is substantially less than 50 microns. Care is taken to maintain the moisture content below 1%; any small amounts of moisture present are absorbed by reaction with the unslaked lime (CaO) present in the mixture. The mixture can be applied to turf, for example, at the rate of 1 to 4 ounces per 1000 square feet. This quantity can usually be applied in from 3 to 15 gallons of water. The mixture will control turf diseases such as dollar spot, brown patch, and copper spot.

Example 12

| | Percent |
|---|---|
| Chlorophenol mercury sulfate | 8.7 |
| Tetramethylthiuram disulfide | 34.6 |
| Urea | 25.0 |
| CaO | 7.5 |
| Sodium carbonate | 11.5 |
| Hexamethylenetetramine | 7.77 |
| Alkyl naphthalene sodium sulfonate | 1.0 |
| Sodium lignin sulfonates | 0.9 |
| Hodag 303 antifoam | 0.9 |
| Green Lake | 0.9 |
| Ethylene glycol | 0.45 |
| Zinc sulfate | 0.04 |
| Cupric chloride | 0.06 |
| Manganese chloride | 0.10 |
| Borax | 0.02 |
| Molybdenum oxide | 0.02 |
| Magnesium sulfate | 0.50 |
| Ferric sulfate | 0.04 |

The ingredients are blended in a ribbon blender until the mixture is uniform. The powder is then passed twice through a micropulverizer. The product is a light-green powder that can easily be slurried in water for application to turf, for example, at a rate of 4 ounces per 1000 square feet. The mixture is an effective turf fungicide, which in addition also stimulates the growth of lawn grasses by supplying to the plants a fertilizer and mixed trace elements that make up for partial deficiencies that often exist in many soils.

The invention claimed is:
1. A fungicidal composition comprising, in admixture,
(A) a tetraalkylthiuram sulfide selected from the group consisting of tetramethylthiuram monosulfide, tetramethylthiuram disulfide, tetraethylthiuram monosulfide, and tetraethylthiuram disulfide,

(B) a water-insoluble phenol mercury compound having the formula

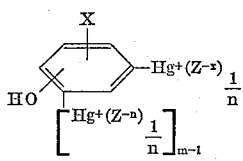

where
X is selected from the group consisting of hydrogen, chlorine, bromine, hydroxyl, and lower alkyl having 1–3 carbons;
$m$ is a whole number of less than 3;
$n$ is a whole number of less than 4; and
Z is a negative radical selected from the group consisting of hydroxyl, halide, acetate, carbonate, sulfate, phosphate, propionate and lactate;
(C) a compound selected from the group consisting of hexamethylenetetramine, cyanamide and trilower alkanolamines; and
(D) a solid water-soluble inorganic base selected from the group consisting of sodium hydroxide, calcium hydroxide, calcium oxide, potassium hydroxide, sodium carbonate, and potassium carbonate;

said tetraalkylthiuram sulfide compound being present in a proportion of from 1:1 to 30:1 to the phenol mercury compound, the compound of (C) being present in the composition in a proportion of from 0.05:1 to 10:1 to the phenol mercury compound, and the compound of (D) being present in the composition in an amount of at least a molar equivalency of said phenol mercury compound, said composition having no more than 5% water present.

2. A method for the control of fungi, said method comprising applying, to the organic material to be protected from fungus attack, a fungicidally effective amount of a composition according to claim 1.

3. Fungicidal composition comprising in admixture (A) tetramethylthiuram disulfide
(B) chlorophenolmercury sulfate
(C) hexamethylenetetramine and
(D) calcium carbonate;

said tetramethylthiuram disulfide being present in the proportion of from 1:1 to 30:1 to the chlorophenolmercury sulfate, and said hexamethylenetetramine being present in the proportion of from 0.05:1 to 10:1 to the chlorophenolmercury sulfate, said calcium carbonate being present in an amount of at least a molar equivalency of said chlorophenol mercury sulfate, said composition having no more than 5% water present.

References Cited by the Examiner
UNITED STATES PATENTS

| 2,043,257 | 6/36 | Missbach | 167—42 |
| 2,674,537 | 4/54 | Hopkins et al. | 99—222 |
| 3,034,949 | 5/62 | Ryker | 167—22 |

FOREIGN PATENTS

| 587,263 | 4/47 | Great Britain. |
| 827,434 | 2/60 | Great Britain. |

OTHER REFERENCES

Fowkes et al., J. Agr. Food Chem., vol. 8, No. 3, May–June 1960, pp. 203–209.
Frear, A Catalogue of Insecticides and Fungicides, 1948, Chronica Botanica Co.., vol. II, pp. 51, 53–55.
Frear, Chemistry of the Pesticides, 3d Ed., 1955, pp. 294–301, 358, 359, Van Nostrand Co.
Handbook of Aldrin, Dieldrin, and Endrin Formulations, published by Shell Chemical Corp., 1954, pp, 78–79.
Merck Index, 6th Ed., 1952, page 972, entry "triethanolamine."

JULIAN S. LEVITT, *Primary Examiner.*

M. O. WOLK, FRANK CACCIAPAGLIA, JR., LEWIS GOTTS, *Examiners.*

UNITED STATES PATENT OFFICE
CERTIFICATE OF CORRECTION

Patent No. 3,192,104  June 29, 1965

Harris M. Baker

It is hereby certified that error appears in the above numbered patent requiring correction and that the said Letters Patent should read as corrected below.

Column 4, lines 22 and 23, for "nonabsorptice" read -- nonabsorptive --; column 9, lines 3 to 9, for that portion of the formula reading:

$$-Hg^+(Z^{-x})_{\frac{1}{n}} \quad \text{read} \quad -Hg^+(Z^{-n})_{\frac{1}{n}}$$

Signed and sealed this 21st day of December 1965.

(SEAL)
Attest:

ERNEST W. SWIDER  EDWARD J. BRENNER
Attesting Officer  Commissioner of Patents